Sept. 23, 1924.  
A. G. ATCHISON  
WINDSHIELD CLEANER  
Filed Dec. 15, 1923  
1,509,699  
2 Sheets-Sheet 1

A. G. Atchison
INVENTOR
BY Victor J. Evans
ATTORNEY

WITNESS:

Sept. 23, 1924.
A. G. ATCHISON
WINDSHIELD CLEANER
Filed Dec. 15, 1923    2 Sheets-Sheet 2
1,509,699
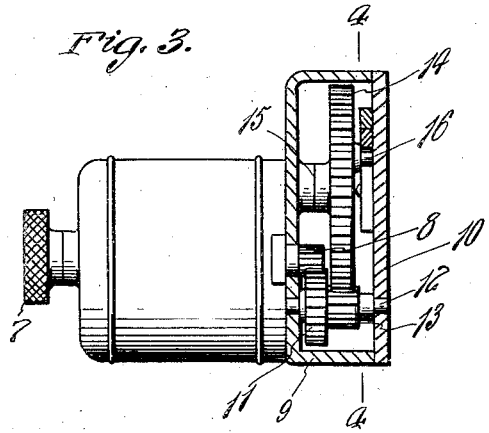
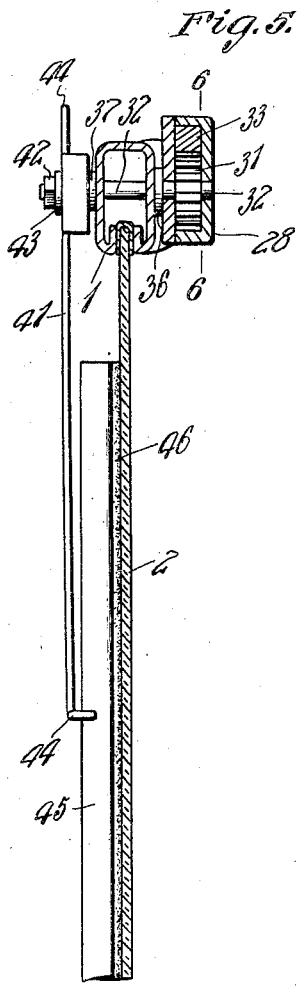
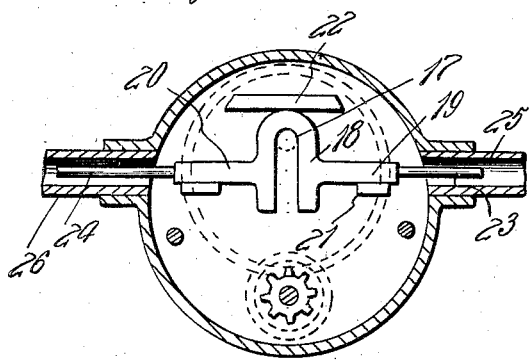
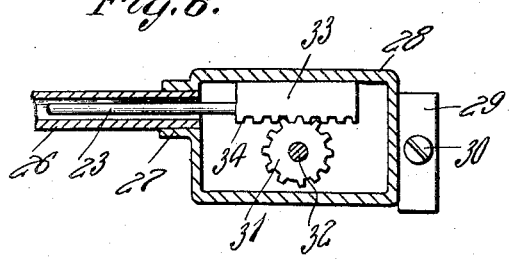
A. G. Atchison
INVENTOR
BY Victor J. Evans
ATTORNEY
WITNESS:

Patented Sept. 23, 1924.

1,509,699

UNITED STATES PATENT OFFICE.

ARLO GRANT ATCHISON, OF SANTA BARBARA, CALIFORNIA.

WINDSHIELD CLEANER.

Application filed December 15, 1923. Serial No. 680,987.

*To all whom it may concern:*

Be it known that I, ARLO GRANT ATCHISON, a citizen of the United States, residing at Santa Barbara, in the county of Santa Barbara and State of California, have invented new and useful Improvements in Windshield Cleaners, of which the following is a specification.

An object of this invention is to produce an electrically operated windshield wiper for automobiles wherein two wiping elements are employed and simultaneously operated to clean the windshield so that both the driver and the passenger on the front seat of the machine will have a clear view of traffic conditions ahead of the machine.

The invention further resides in other features of construction and the combination and operative arrangement of elements to be hereinafter fully described, illustrated in the accompanying drawings and specifically pointed out in the appended claims.

In describing the invention in detail, reference is to be had to the drawings wherein like characters denote like or corresponding parts throughout the several views.

In the drawings:—

Figure 3 is a side elevation of the motor casing, the gear housing associated therewith being in section.

Figure 4 is a sectional view on the line 4—4 of Figure 3.

Figure 5 is an enlarged sectional view on the line 5—5 of Figure 1, looking in the direction of the arrows.

Figure 6 is a sectional view on the line 6—6 of Figure 5.

Figure 1:
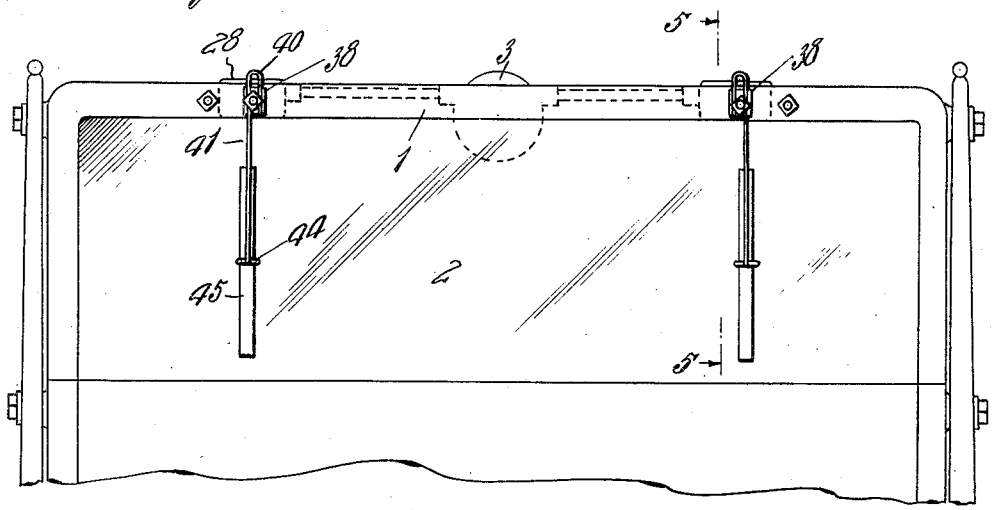
Figure 1 is a view looking toward the front of an automobile windshield provided with the improvement.
Figure 2:
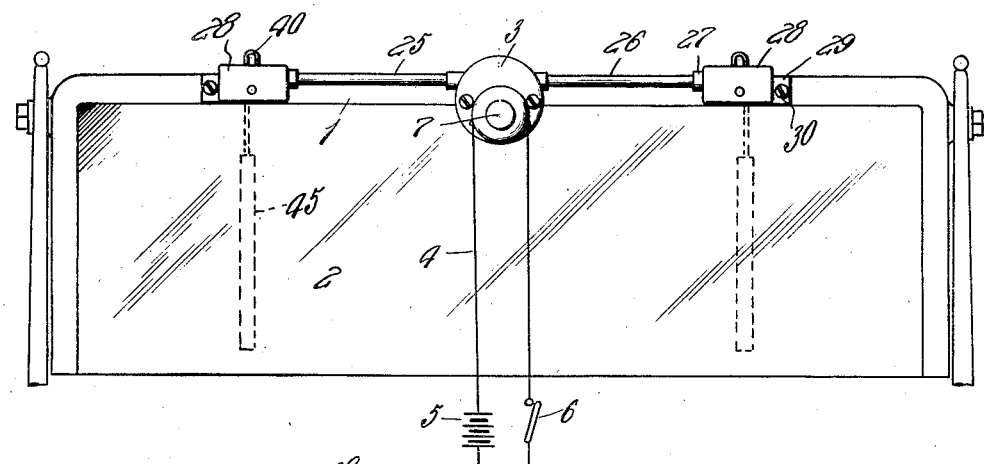
Figure 2 is a view looking toward the rear of the windshield.
Figure 7:
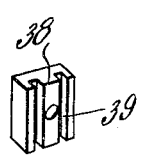
Figure 7 is a perspective view of the grooved blocks for the arm of the wiping element.

Arranged centrally on the top rail 1 for the upper sash 2 of an automobile windshield there is a casing 3. In this casing there is an electric motor which is of the usual construction and which will not, therefore, require a detailed description. The binding posts, associated with the brushes of the motor have secured thereto conductors 4 connected to the battery 5 for the automobile and controlled by a switch 6. The switch is conveniently located with respect to the driver of the machine so that the motor can be turned on or off, as desired.

The armature shaft of the motor has secured on one end thereof a knurled knob 7, and on its opposite end a pinion 8. The pinion 8 is received in a suitable housing 9 that may be integrally formed with the motor casing 3, the outer face of the housing being open, but closed by a plate 10 secured thereon in any desired or preferred manner. The plate 10 may be likewise secured to the rail 1 of the windshield sash 2.

The pinion 8 is in mesh with a gear 11 fixed on a suitable shaft 12 journaled in bearings in the front and rear faces of the housing and carrying a second pinion 13. This last mentioned pinion is in mesh with a gear wheel 14 that has its shaft journaled in a suitable bearing post 15 on the inner face of the housing 9. On its outer face there is eccentrically secured on the wheel 14 a pin or stub 16 on which there is preferably journaled a roller 17 which is received between the arms of the substantially inverted U-shaped central portion 18 of a bar. The portions of the bar extending from the sides of the inverted U or cranked central portion thereof, are indicated by the numerals 19 and 20 respectively, and the said portions find bearings on flat lugs 21 secured on the face plate 10. The upper rounded central portion 18 of the bar is in contacting engagement with an elongated plate 22 also secured on the inner face of the plate 10. The pin 16 and its roller 17 are so positioned on the wheel 14 that when the motor is operated and the said wheel is thus revolved, a continuous reciprocatory movement will be imparted to the arms 19 and 20 of the bar.

The arms 19 and 20 have secured to their ends rods 23 and 24 respectively which are received in tubes 25 and 26 respectively that are secured to and extend longitudinally in opposite directions from the housing 9.

The tubes 25 and 26 are each of the same length and have their outer ends received in annular flanges 27 provided upon the inner faces of substantially rectangular housings 28. Each housing has on its outer end a lug extension 29 through which is passed an element 30 that secures the housing on the rail 1. In each housing there is a pinion 31 whose shaft 32 finds a bearing in the opposite faces of the housings and pass through bearing openings in the rail 1 so that the shaft is extended through the outer face of the said rail. The pinions are, of course, fixed to the shafts, and the said shafts provide supports, additional to the elements 30, for the housings 28.

On the inner end of each rod 23 and 24 there is secured a block 33 whose lower face is toothed, as at 34. The upper face of the block is in contacting engagement with the upper wall of the housing, and the teeth 34 are in mesh with those on the pinions 31.

As disclosed particularly in Figure 5 of the drawings it will be seen that a suitable washer 36 is arranged on each shaft 32 between the housing 28 and the rail 1, and that the portion of the said shaft extending through the rail is provided with an additional washer 37. The outer end of each shaft 32 is preferably threaded and has arranged thereon a normally vertically disposed block 38. Each block 38, adjacent its sides is grooved longitudinally, as at 39, and in these spaced grooves there are received the rounded upper end portions 40 of arms 41. The portion of the shafts 32 on which the blocks are received may be square, but the said blocks are held effectively secured to the said shafts by nuts 42 which bind against the rounded end portions of the arms 41, washers 43 which effectively hold the said ends of the arms in the grooves of the blocks. The arms 41 are of resilient material, and the outer ends thereof are bent upon themselves to form hooks 44 that pass through openings in the center of the cross sectionally U-shaped casings 45 for the wiper or squeegee element 46. The spring arms 41 will at all times force the squeegees against the outer face of the windshield.

The switch 6 may be in the nature of a push-button and may be operated either by the hand or foot. The closing of the switch completes the circuit to operate the motor, and incident to the train of gears actuated by the turning of the motor the wheel 14 will be rapidly revolved. This will impart a rapid reciprocatory movement to the rods 23 and 24 so that the rack elements 33 will rapidly turn the gears 31 in both directions to impart an oscillatory swinging movement to the squeegees. By providing two squeegees, frost or moisture on the glass in front of the driver and other occupant of the front seat of an automobile will be removed so that their vision will not be impaired, and in fact, the sweeping movement of the spaced squeegees will clean almost the entire outer surface of the windshield.

The device may be operated by hand, it being simply necessary to turn the knurled button 7 in opposite directions. The spring arms carrying the squeegees are adjustably connected to the blocks 38, so that these arms can be lengthened or shortened as desired, and a greater or less surface of the windshield will be contacted by the squeegees.

The rods 23 and 24 may be in the nature of a single element, and may be centrally bent upon themselves to provide a cranked portion similar to the inverted U-shaped portion 18 from which the plates 19 and 20 project.

It is thought from the foregoing description that the advantages and novel features of the invention will be readily apparent.

I desire it to be understood that I may make such changes in the combination and arrangement of parts, as fall within the scope of what I claim.

Having described the invention, I claim:—

1. In a windshield cleaner, a motor, a rod, guide means for the rod, connections between the motor and said rod whereby the latter is reciprocated, racks on the end of the rod, housings for the racks, shafts passing through the housings and through the upper bar of the windshield, a gear on each shaft in mesh with each rack, a spring arm adjustably connected to each pivot, and a squeegee carrying casing pivotally secured to each arm, as and for the purpose set forth.

2. In a windshield cleaner, an electrically operated motor, a gear housing on the inner face thereof, a pinion therein carried by the motor shaft, a knob on the outer face of the casing also secured on the motor shaft, rods, guide means for the rods, means actuated by the pinion for reciprocating said rods, a rack on the outer end of each rod, a shaft passing through the casing and through the upper bar of a windshield, a pinion on each shaft engaged by each rack, a grooved block on the outer end of each shaft, a spring arm having a U-shaped end received in the grooves of the blocks, means adjustably sustaining the arms in said blocks, each of said arms having its outer end hook-shaped, and a squeegee carrying casing to which said ends are loosely connected, as and for the purpose set forth.

In testimony whereof I affix my signature.

ARLO GRANT ATCHISON.